United States Patent [19]
Fukuoka et al.

[11] Patent Number: 5,914,940
[45] Date of Patent: Jun. 22, 1999

[54] MULTIPOINT VIDEO CONFERENCE CONTROLLING METHOD AND SYSTEM CAPABLE OF SYNCHRONIZING VIDEO AND AUDIO PACKETS

[75] Inventors: Hideyuki Fukuoka; Hiromi Mizuno, both of Tokyo, Japan

[73] Assignee: NEC Corporation, Japan

[21] Appl. No.: 08/796,628

[22] Filed: Feb. 7, 1997

[30] Foreign Application Priority Data

Feb. 9, 1996 [JP] Japan ...................................... 8-048364

[51] Int. Cl.[6] ............................ H04L 12/16; H04Q 11/00
[52] U.S. Cl. ......................... 370/263; 370/365; 370/366; 348/423; 455/416
[58] Field of Search ..................................... 370/260, 263, 370/264, 265, 266, 267, 365, 366; 348/423, 15; 379/202, 158; 455/416

[56] References Cited

U.S. PATENT DOCUMENTS

| | | | |
|---|---|---|---|
| 4,360,827 | 11/1982 | Braun | 348/15 |
| 5,257,306 | 10/1993 | Watanabe | 348/15 |
| 5,375,068 | 12/1994 | Palmer et al. | . |
| 5,384,772 | 1/1995 | Marshall | 370/235 |
| 5,440,565 | 8/1995 | Miyamoto et al. | . |
| 5,546,324 | 8/1996 | Palmer et al. | 348/15 |
| 5,608,653 | 3/1997 | Palmer et al. | 395/200.34 |
| 5,627,825 | 5/1997 | Barraclough et al. | 370/260 |
| 5,657,096 | 8/1997 | Lukacs | 348/585 |
| 5,764,277 | 6/1998 | Loui et al. | 348/14 |

FOREIGN PATENT DOCUMENTS

| | | |
|---|---|---|
| 669764 | 8/1995 | European Pat. Off. . |
| 5-130601 | 5/1993 | Japan . |
| 7-50818 | 2/1995 | Japan . |

*Primary Examiner*—Ajit Patel
*Assistant Examiner*—Bob A. Phunkulh
*Attorney, Agent, or Firm*—Ostrolenk, Faber, Gerb & Soffen, LLP

[57] ABSTRACT

In a multipoint video conference controlling system which is supplied with video packets and audio packets from conference terminals, multiplexes the video packets to produce a composite video packet, and mixes the audio packets to produce a mixed audio packet, a sequence number collating device collates the sequence numbers of the video packets and the audio packets to produce a coincidence signal when the sequence numbers of the video packets and the audio packets coincide with each other. Video and audio transmitting devices transmit synchronously the composite video packet and the mixed audio packet in response to the coincidence signal. The multipoint video conference controlling system may comprise video and audio sequence number processing devices which add one of sequence numbers to the composite packet and the mixed audio packet when the video packets and the audio packets have the sequence numbers. The multipoint video conference controlling system may comprise a sequence number producing and adding device which produces a sequence number in response to one of multiplexed video and audio packets from a video server and adds the sequence number to the composite video packet and the mixed audio packet.

12 Claims, 10 Drawing Sheets

MULTIPOINT VIDEO CONFERENCE CONTROLLING METHOD AND SYSTEM CAPABLE OF SYNCHRONIZING VIDEO AND AUDIO PACKETS

BACKGROUND OF THE INVENTION

This invention relates to a multipoint video conference controlling method and system which communicates by using video signals and audio signals in such as a television conference and a conference in kept at seat.

DESCRIPTION OF THE RELATED ART

Recommendation H.320 is determined as an international standard specification in the video conference controlling system. This recommendation H.320 does not describe a method which synchronizes the video signals and the audio signals. Conventionally, a means which seemingly and nearly synchronizes the video signals and the audio signals by giving a constant delay to the audio signals is known. The means can not strictly synchronize the video signals and the audio signals.

A multipoint video conference controlling system which communicates by using video packets and audio packets in networks of transfer rate changing type such as Ethernet and ATM (asynchronous transfer mode)-LAN (local area network) is known. One of methods which synchronize the video packets and the audio packets in the multipoint video conference controlling system is described in Japanese Examined Prepublication No. 71278/1995. In the method, a terminal adds the same sequence number to the video packet and the audio packet which are, at the same time, encoded to transmit the video packet and the audio packet to a receiving device. The receiving device synchronously displays and outputs the video packet and the audio packet having the same sequence numbers.

However, since, the method does not have a multipoint video conference controlling unit (MCU), in the method, only a conference in one to one is carried out. Thus, it is possible to use the method in a conference among three and more points. The multipoint video conference controlling unit uses a network which operates in a relatively low speed of transfer rate of about 64 Kbps. Consequently, a method of using a dynamic image is used to see the images of faces of each other and to indicate materials by using a camera for photographing pictures and calligraphic works. However, since in a network operating in a high speed such as an ATM, there are many opportunities where entry persons carry out team works in response to the dynamic image, it is important to strictly synchronize the video packets and the audio packets. Particularly, in case of transferring the video packets and the audio packets of moving pictures, musics, and sports, it is important to strictly synchronize the video packets and the audio packets.

SUMMARY OF THE INVENTION

It is therefore an object of the present invention to provide a multipoint video conference controlling method and system which is capable of strictly synchronizing video packets and audio packets.

Other objects of the present invention will become clear as the description proceeds.

According to the first aspect of the present invention, there is provided a multipoint video conference controlling method, which is supplied with video packets and audio packets from a plurality of video conference terminals, multiplexes the video packets to produce a composite video packet, mixes the audio packets to produce a mixed audio packet, and transmits the composite video packet and the mixed audio packet to the video conference terminals, the multipoint video conference controlling method comprising the steps of:

collating sequence numbers of the video packets and the audio packets to produce a coincidence signal when the sequence numbers of the video packets and the audio packets coincide with each other; and transmitting synchronously the composite packet and the mixed audio packet in response to the coincidence signal.

According to the second aspect of the present invention, there is provided a multipoint video conference controlling method, which is supplied with video packets and audio packets from a plurality of video conference terminals, multiplexes the video packets to produce a composite video packet, mixes the audio packets to produce a mixed audio packet, and transmits the composite video packet and the mixed audio packet to the video conference terminals, the multipoint video conference controlling method comprising the steps of:

adding one of sequence numbers to the composite video packet and the mixed audio packet when the video packets and the audio packets have the sequence numbers; and transmitting synchronously the composite video packet and the mixed audio packet having the sequence numbers.

According to the third aspect of the present invention, there is provided a multipoint video conference controlling method, which is supplied with video packets and audio packets from a plurality of video conference terminals and a video server, multiplexes the video packets to produce a composite video packet, mixes the audio packets to produce a mixed audio packet, and transmits the composite video packet and the mixed audio packet to the video conference terminals, the multipoint video conference controlling method comprising the steps of:

collating sequence numbers of the video packets and the audio packets from the video server to produce a coincide signal when the sequence numbers of the video packets and the audio packets from the video server coincide with each other; and transmitting synchronously the composite packet and the mixed audio packet in response to the coincide signal.

According to the fourth aspect of the present invention, there is provided a multipoint video conference controlling method, which is supplied with video packets and audio packets from a plurality of video conference terminals and a video server, multiplexes the video packets to produce a composite video packet, mixes the audio packets to produce a mixed audio packet, and transmits the composite video packet and the mixed audio packet to the video conference terminals, the multipoint video conference controlling method comprising the steps of:

adding one of sequence numbers to the composite video packet and the mixed audio packet when the video packets and the audio packets from the video server have the sequence numbers; and transmitting synchronously the composite video packet and the mixed audio packet having the sequence numbers.

According to the fifth aspect of the present invention, there is provided a multipoint video conference controlling method, which is supplied with video packets and audio packets from a plurality of video conference terminals, and with multiplexed video and audio packets each of which has the video packets and the audio packets from a video server, multiplexes the video packets to produce a composite video packet, mixes the audio packets to produce a mixed audio packet, and transmits the composite video packet and the mixed audio packet to the video conference terminals, the multipoint video conference controlling method comprising the steps of:

producing sequence numbers in response to one of the multiplexed video and audio packets from the video server;

adding the sequence numbers to the composite video packet and the mixed audio packet; and transmitting synchronously the composite video packet and the mixed audio packet having the sequence numbers.

According to the sixth aspect of the present invention, there is provided a multipoint video conference controlling system, which is supplied with video packets and audio packets from a plurality of video conference terminals, multiplexes the video packets to produce a composite video packet, mixes the audio packets to produce a mixed audio packet, and transmits the composite video packet and the mixed audio packet to the video conference terminals, the multipoint video conference controlling system comprising:

collating means for collating sequence numbers of the video packets and the audio packets to produce a coincidence signal when the sequence numbers of the video packets and the audio packets coincide with each other; and transmitting means for transmitting synchronously the composite video packet and the mixed audio packet when the transmitting means is supplied with the coincidence signal from the collating means.

According to the seventh aspect of the present invention, there is provided a multipoint video conference controlling system, which is supplied with video packets and audio packets from a plurality of video conference terminals, multiplexes the video packets to produce a composite video packet, mixes the audio packets to produce a mixed audio packet, and transmits the composite video packet and the mixed audio packet to the video conference terminals, the multipoint video conference controlling system comprising:

adding means for adding one of sequence numbers to the composite video packet and the mixed audio packet when the video packets and the audio packets have the sequence numbers; and transmitting means for transmitting synchronously the composite video packet and the mixed audio packet having the sequence numbers.

According to the eighth aspect of the present invention, there is provided a multipoint video conference controlling system, which is supplied with video packets and audio packets from a plurality of video conference terminals and a video server, multiplexes the video packets to produce a composite packet, mixes the audio packets to produce a mixed audio packet, and transmits the composite video packet and the mixed audio packet to the video conference terminals, the multipoint video conference controlling system comprising:

collating means for collating sequence numbers of the video packets and the audio packets from the video server to produce a coincidence signal when the sequence numbers of the video packets and the audio packets from the video server coincide with each other; and transmitting means for transmitting synchronously the composite video packet and the mixed audio packet when the transmitting means is supplied with the coincidence signal from the collating means.

According to the ninth aspect of the present invention, there is provided a multipoint video conference controlling system, which is supplied with video packets and audio packets from a plurality of video conference terminals and a video server, multiplexes the video packets to produce a composite video packet, mixes the audio packets to produce a mixed audio packet, and transmits the composite video packet and the mixed audio packet to the video conference terminals, the multipoint video conference controlling system comprising:

adding means for adding one of sequence numbers to the composite video packet and the mixed audio packet when the video packets and the audio packets from the video server have the sequence numbers; and transmitting means for transmitting synchronously the composite video packet and the mixed audio packet having the sequence numbers.

According to the tenth aspect of the present invention, there is provided a multipoint video conference controlling system, which is supplied with video packets and audio packets from a plurality of video conference terminals, and with multiplexed video and audio packets each of which has the video packets and the audio packets from a video server, multiplexes the video packets to produce a composite video packet, mixes the audio packets to produce a mixed audio packet, and transmits the composite video packet and the mixed audio packet to the video conference terminals, the multipoint video conference controlling system comprising:

Producing means for producing sequence numbers in response to one of the multiplexed video and audio packets from the video server;

adding means for adding the sequence numbers to the composite packet and the mixed audio packet; and transmitting means for transmitting synchronously the composite video packet and the mixed audio packet having the sequence numbers.

DESCRIPTION OF THE PREFERRED EMBODIMENTS

Figure 1:
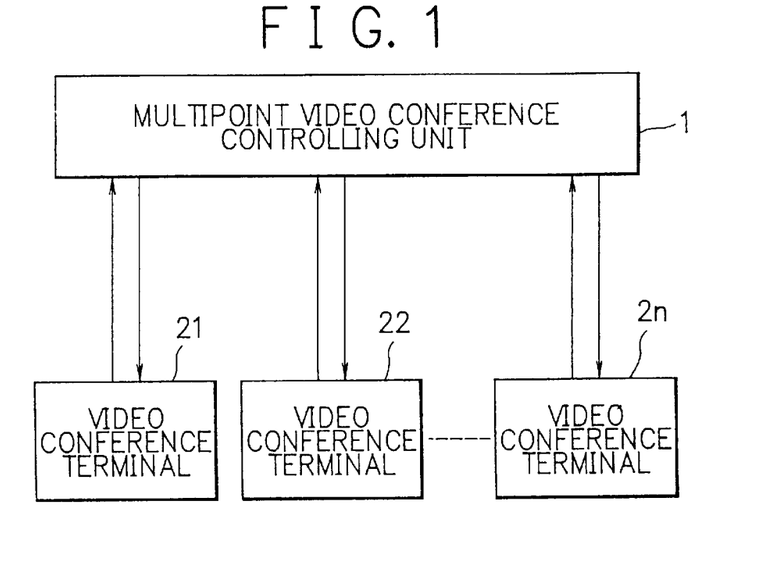
FIG. 1 is a block diagram of a multipoint video conference controlling system according to the first embodiment of the present invention.

Referring to FIGS. 1, 2, 3, 4, and 5 the description will proceed to a multipoint video conference controlling method and system according to the first embodiment of the present invention. In FIG. 1, the multipoint video conference controlling system comprises a multipoint video conference controlling unit 1 and a plurality of video conference terminals 21 to 2n connected to the multipoint video conference controlling unit 1, where n represents an integer greater than two.

Figure 2:
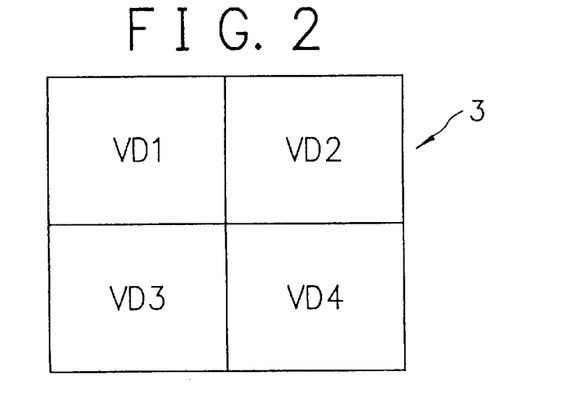
FIG. 2 is a schematic front view for the display of the video conference terminal of the multipoint video conference controlling system illustrated in FIG. 1.
Figure 3:
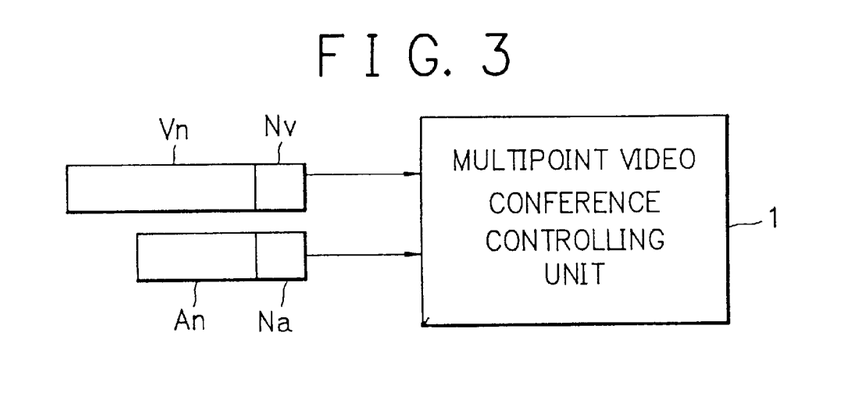
FIG. 3 is a view for use in describing a video packet and an audio packet in the video conference terminal of the multipoint video conference controlling system illustrated in FIG. 1.

The video conference terminals 21 to 2n transmit video packets V1 to Vn and audio packets A1 to An to the multipoint video conference controlling unit 1. As shown in FIG. 2, for example, a display device 3 of each of the video conference terminals 21 to 2n has four video surfaces VD1 to VD4. As shown in FIG. 3, each of video packets V1 to Vn has a sequence number Nv and each of the audio packets A1 to An has a sequence number Na.

The multipoint video conference controlling unit 1 is supplied with the video packets V1 to Vn and the audio packets A1 to An from the video conference terminals 21 to 2n.

The multipoint video conference controlling unit 1 multiplexes the video packets V1 to Vn to produce a composite video packet CV. Also, the multipoint video conference controlling unit 1 mixes the audio packets A1 to An to produce a mixed audio packet MA. The multipoint video conference controlling unit 1 transmits the composite video packet CV and the mixed audio packet MA to the video conference terminals 21 to 2n.

Figure 4:
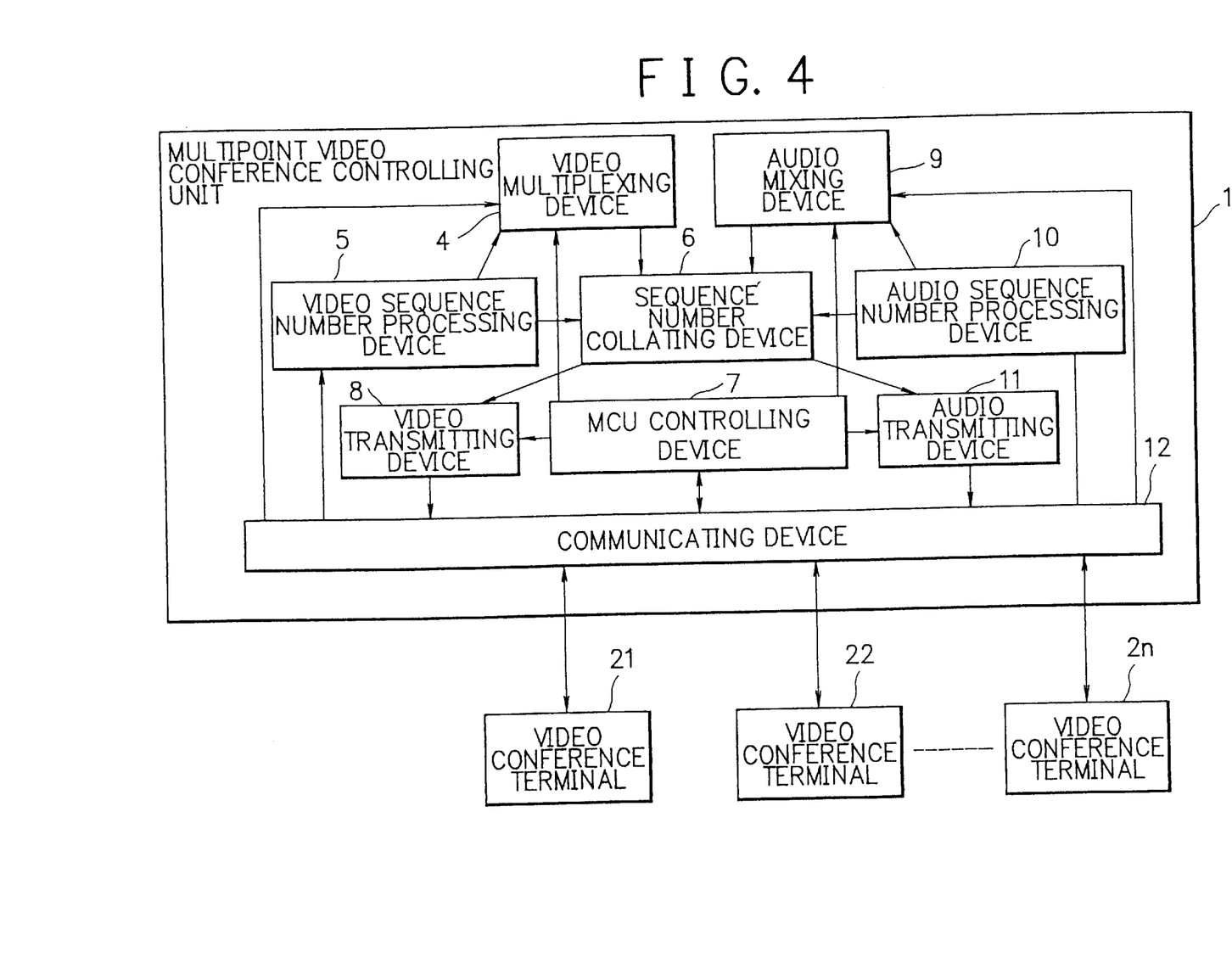
FIG. 4 is a block diagram of a multipoint video conference controlling unit in the multipoint video conference controlling system illustrated in FIG. 1.

In FIG. 4, the multipoint video conference controlling unit 1 comprises a video multiplexing device 4 a video sequence number processing device 5, a sequence number collating device 6, a MCU controlling device 7, a video transmitting device 8, an audio mixing device 9, an audio sequence number processing device 10, an audio transmitting device 11, and a communicating device 12. The communicating device 12 is connected to the video conference terminals 21 to 2n. The video multiplexing device 4 is connected to the communicating device 12, the video sequence number processing device 5, the sequence number collating device 6, and the MCU controlling device 7. The video sequence number processing device 5 is connected to the communicating device 12 and the sequence number collating device 6. The video transmitting device 8 is connected to the communicating device 12 the sequence number collating device 6, and the MCU controlling device 7. The audio mixing device 9 is connected to the communicating device 12, the audio sequence number processing device 10, the sequence number collating device 6, and the MCU controlling device 7. The audio sequence number processing device 10 is connected to the communicating device 12 and the sequence number collating device 6. The audio transmitting device 11 is connected to the communicating device 12, the sequence number collating device 6, and the MCU controlling device 7. In addition, the MCU controlling device 7 is connected to the communicating device 12.

The communicating device 12 is supplied with the video packets V1 to Vn having the sequence numbers from the video conference terminals 21 to 2n to supply the video packets V1 to Vn having the sequence numbers for the video sequence number processing device 5. The video sequence number processing device 5 holds one of the sequence numbers to supply the video packets V1 to Vn for the video multiplexing device 4. The video multiplexing device 4 multiplexes the video packets V1 to Vn to produce a composite video packet CV. The video multiplexing device 4 supplies the composite video packet CV for the sequence number collating device 6.

The communicating device 12 is supplied with the audio packets A1 to An having the sequence numbers from the video conference terminals 21 to 2n to supply the audio packets A1 to An having the sequence numbers for the audio sequence number processing device 10. The audio sequence number processing device 10 holds one of the sequence numbers to supply the audio packets A1 to An for the audio mixing device 9. The audio mixing device 9 mixes the audio packets A1 to An to produce a mixed audio packet MA. The audio mixing device 9 supplies the mixed audio packet MA for the sequence number collating device 6. The sequence number collating device 6 is supplied with the composite video packet CV and the mixed audio packet MA from the video multiplexing device 4 and the audio mixing device 9, respectively. In addition, the sequence number collating device 6 is supplied with the two ones of the sequence numbers of the video packets V1 to Vn and the audio packets A1 to An from the video sequence number processing device 5 and the audio sequence number processing device 10 respectively. The sequence number collating device 6 collates the two ones of the sequence numbers of the video packets V1 to Vn and the audio packets A1 to An to produce a coincidence signal when the two ones of the sequence numbers of the video packets V1 to Vn and the audio packets A1 to An coincide with each other.

The sequence number collating device 6 supplies the coincidence signal and the composite video packet CV for the video transmitting device 8. Also, the sequence number collating device 6 supplies the coincidence signal and the mixed audio packet MA for the audio transmitting device 11. The sequence number collating device 6, at the same time, supplies the coincidence signal for both of the video transmitting device 8 and the audio transmitting device 11. The video transmitting device 8 and the audio transmitting device 11 synchronously transmit the composite video packet CV and the mixed audio packet MA in response to the coincidence signal to the video conference terminals 21 to 2n through the communicating device 12. The MCU controlling device 7 controls the video multiplexing device 4, the video transmitting device 8, the audio mixing device 9, the audio transmitting device 11, and the communicating device 12.

In addition, the multipoint video conference controlling system may comprise video conference terminals which supply the video packets and the audio packets without the sequence numbers for the communicating device 12. In this event, the communicating device 12 is supplied with the video packets without the sequence numbers from the video conference terminals to supply the video packets for the video multiplexing device 4. Also, the communicating device 12 is supplied with the audio packets without the sequence numbers from the video conference terminals to supply the audio packets for the audio mixing device 9.

Figure 5:
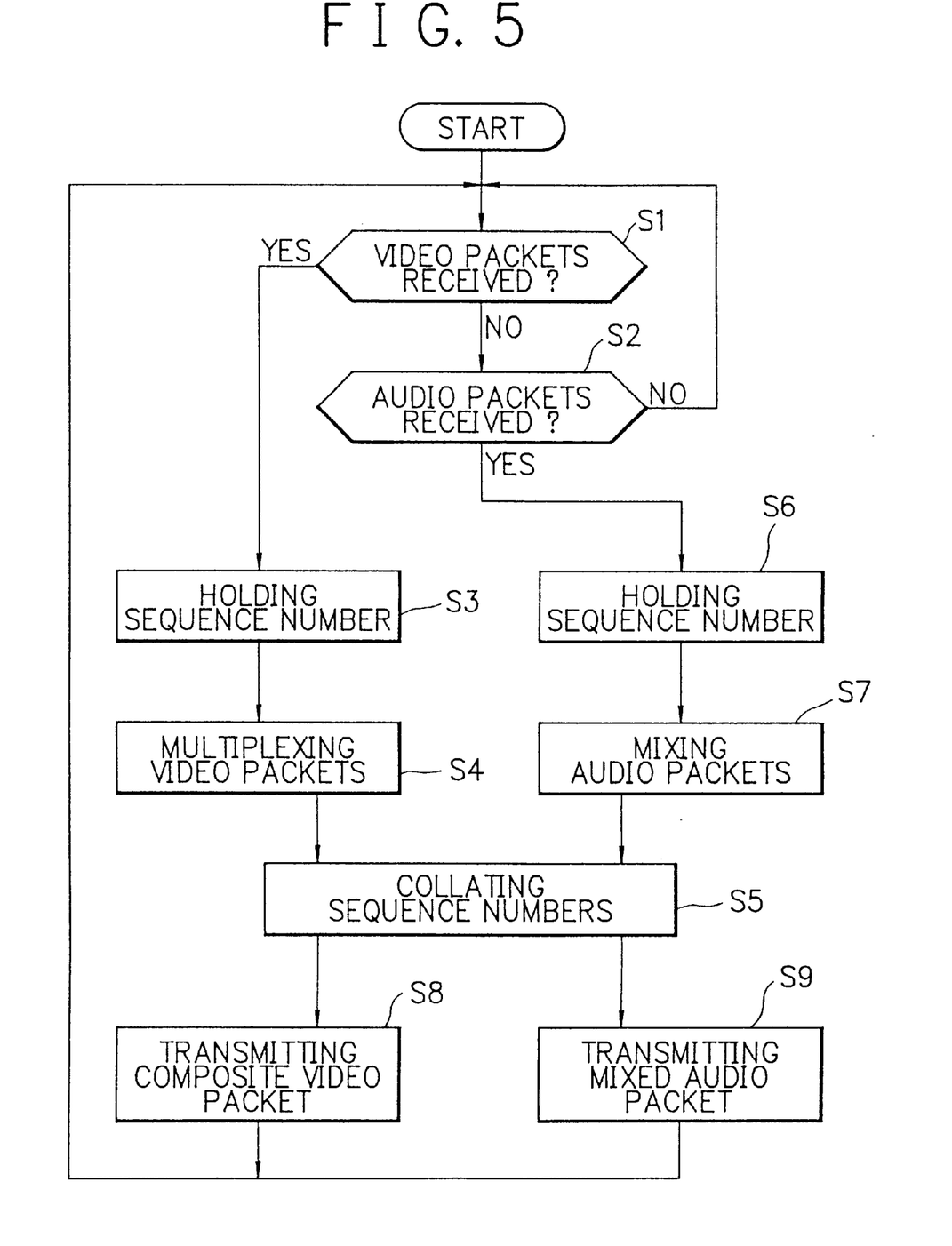
FIG. 5 is a flow chart for use in describing operation of the multipoint video conference controlling unit illustrated in FIG. 4.

Referring to FIG. 5, description will proceed to operation of the multipoint video conference controlling unit 1. At step S1, the MCU controlling device 7 judges whether or not the video packets V1 to Vn are received by the communicating device 12. When the video packets V1 to Vn are received by the communicating device 12, the step S1 is followed by step S3. Otherwise, the step S1 is followed by step S2. At the step S2, the MCU controlling device 7 judges whether or not the audio packets A1 to An are received by the communicating device 12. When the audio packets A1 to An are received by the communicating device 12, the step S2 is followed by a step S6. Otherwise, the step S2 returns to the step S1.

At the step S3, the video sequence number processing device 5 holds the one of the sequence numbers of the video packets V1 to Vn to supply the video packets V1 to Vn for the video multiplexing device 4. The step S3 proceeds to step S4 at which the video multiplexing device 4 multiplexes the video packets V1 to Vn to produce a composite video packet CV. In addition, at the step S4, the video multiplexing device 4 supplies the composite video packet CV for the sequence number collating device 6. The step S4 proceeds to step S5.

At the step S6, the audio sequence number processing device 10 holds the one of the sequence numbers of the audio packets A1 to An to supply the audio packets A1 to An for the audio mixing device 9. The step S6 proceeds to step S7 at which the audio mixing device 9 mixes the audio packets A1 to An to produce a mixed audio packet MA. In addition, at the step S6, the audio mixing device 9 supplies the mixed audio packet MIA for the sequence number collating device 6. The step S7 proceeds to the step S5.

At the step S5, the sequence number collating device 6 collates the two ones of the sequence numbers of the video packets V1 to Vn and the audio packets A1 to An to produce a coincidence signal when the two ones of the sequence numbers of the video packets V1 to Vn and the audio packets A1 to An coincide with each other. Also, at the step S5, the sequence number collating device 6 supplies the coincidence signal and the composite video packet CV for the video transmitting device 8. In addition, at the step S5, the sequence number collating device 6 supplies the coincidence signal and the mixed audio packet MA for the audio transmitting device 11. In this event, the sequence number collating device 6, at the same time, supplies the coincidence signal for both of the video transmitting device 8 and the audio transmitting device 11. The step S5 proceeds to steps S8 and S9. At the step S8, the video transmitting device 8 transmits the composite video packet CV to the video conference terminals 21 to 2n through the communicating device 12. At the step S9, the audio transmitting device 11 transmit the composite video packet CV and the mixed audio packet MA to the video conference terminals 21 to 2n through the communicating device 12. In this event, the video transmitting device 8 and the audio transmitting device 11 synchronously transmit the composite video packet CV and the mixed audio packet MA in response to the coincidence signal. The steps S8 and S9 return to the step S1.

Figure 6:
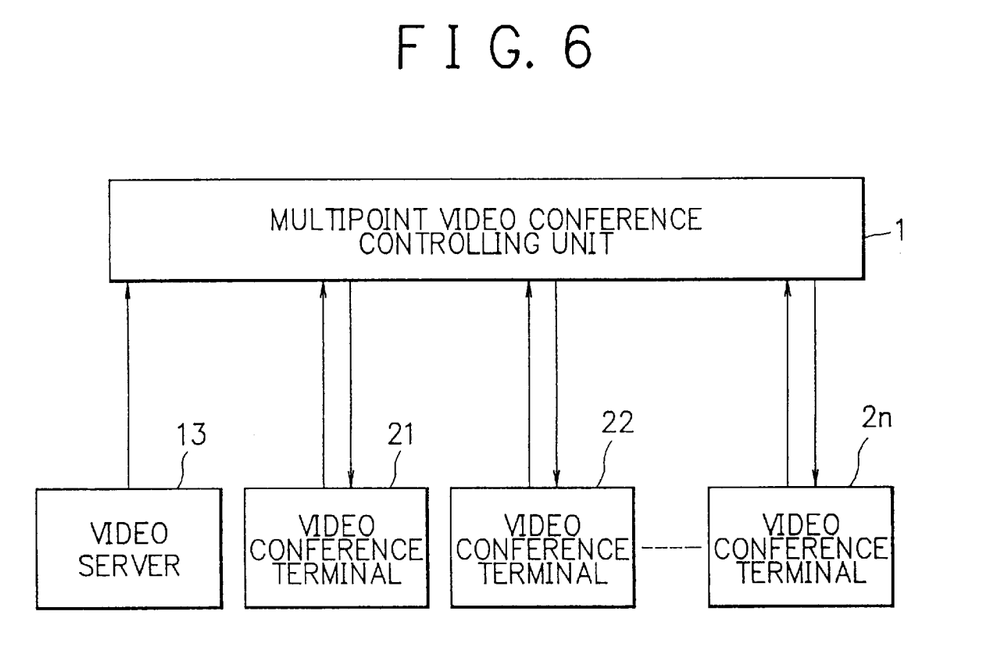
FIG. 6 is a block diagram of a multipoint video conference controlling system according to the second embodiment of the present invention.
Figure 7:
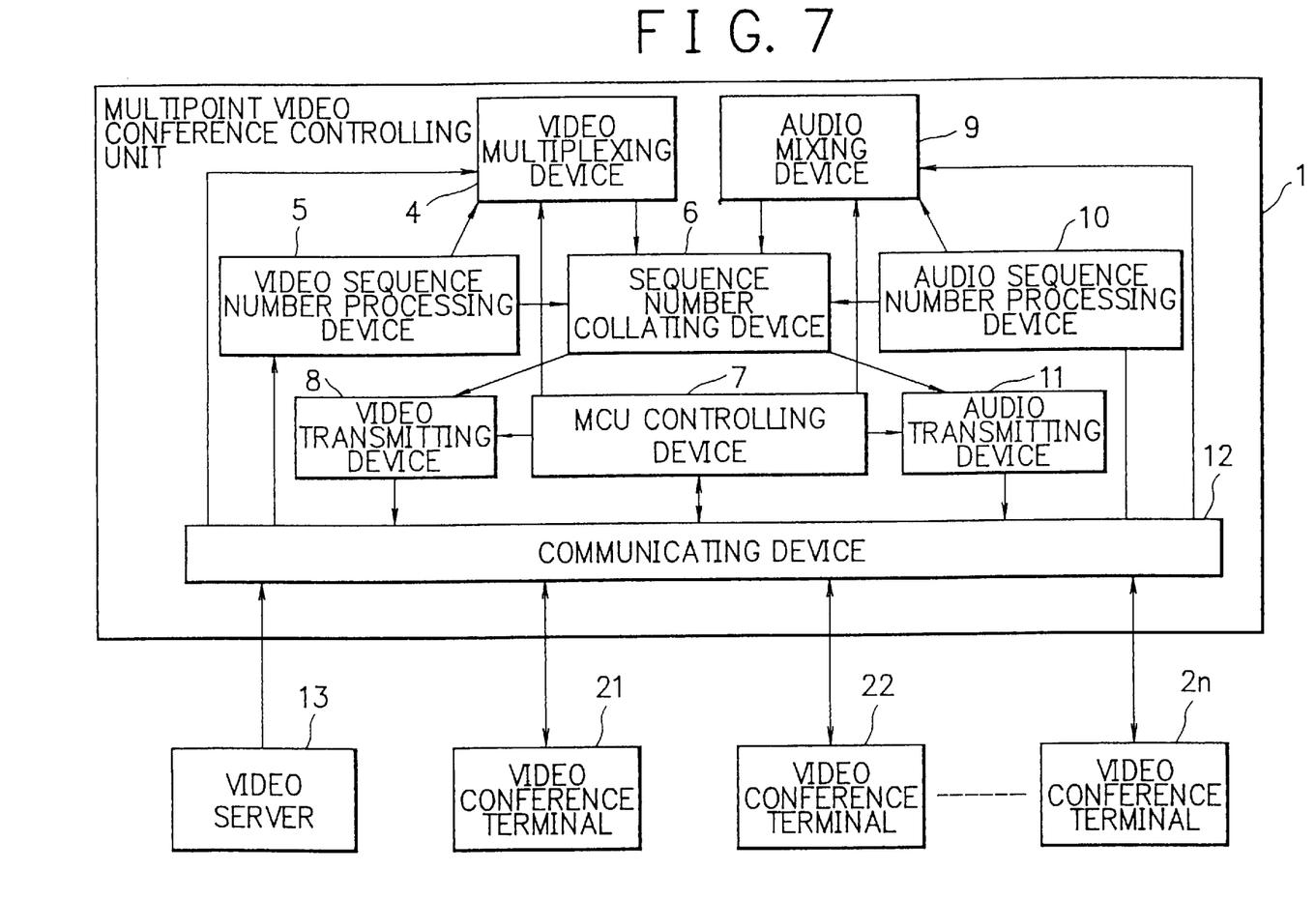
FIG. 7 is a block diagram of a multipoint video conference controlling unit in the multipoint video conference controlling system illustrated in FIG. 6.

Referring to FIGS. 6 and 7, description will proceed to a multipoint video conference controlling method and system according to the second embodiment of the present invention. Similar parts are designated by like reference numerals.

The multipoint video conference controlling system further comprises a video server 13. The video server 13 is connected to the communicating device 12. The video server 13 supplies video packets VoDV and audio packets VoDA having sequence numbers for the communicating device 12.

In this event, the communicating device 12 is supplied with the video packets V1 to Vn and VoDV having the sequence numbers from the video conference terminals 21 to 2n and the video server 13 to supply the video packets V1 to Vn and VoDV having the sequence numbers for the video sequence number processing device 5. The video sequence number processing device 5 holds one of the sequence numbers to supply the video packets V1 to Vn and VoDV for the video multiplexing device 4. The video multiplexing device 4 multiplexes the video packets V1 to Vn and VoDV to produce a composite video packet CV. The video multiplexing device 4 supplies the composite video packet CV for the sequence number collating device 6.

The communicating device 12 is supplied with the audio packets A1 to An and VoDA having the sequence numbers from the video conference terminals 21 to 2n and the video server 13 to supply the audio packets A1 to An and VoDA having the sequence numbers for the audio sequence number processing device 10. The audio sequence number processing device 10 holds one of the sequence numbers to supply the audio packets A1 to An and VoDA for the audio mixing device 9. The audio mixing device 9 mixes the audio packets A1 to An and VoDA to produce a mixed audio packet MA. The audio mixing device 9 supplies the mixed audio packet MA for the sequence number collating device 6. The sequence number collating device 6 is supplied with the composite video packet CV and the mixed audio packet MA from the video multiplexing device 4 and the audio mixing device 9, respectively. In addition, the sequence number collating device 6 is supplied with the two ones of the sequence numbers of the video packets V1 to Vn and VoDV and the audio packets A1 to An and VoDA from the video sequence number processing device 5 and the audio sequence number processing device 10, respectively. The sequence number collating device 6 collates the two ones of the sequence numbers of the video packets V1 to Vn and VoDV and the audio packets A1 to An and VoDA to produce a coincidence signal when the two ones of the sequence numbers of the video packets V1 to Vn and VoDV and the audio packets A1 to An and VoDA coincide with each other.

The sequence number collating device 6 supplies the coincidence signal and the composite video packet CV for the video transmitting device 8. Also, the sequence number collating device 6 supplies the coincidence signal and the mixed audio packet MA for the audio transmitting device 11. The sequence number collating device 6, at the same time, supplies the coincidence signal for both of the video transmitting device 8 and the audio transmitting device 11.

In addition, the multipoint video conference controlling system may comprise the video conference terminals which supply the video packets and the audio packets without the sequence numbers for the communicating device 12. Also, the multipoint video conference controlling system may comprise a video server which supplies the video packets and the audio packets without the sequence numbers for the communicating device 12.

Figure 8:
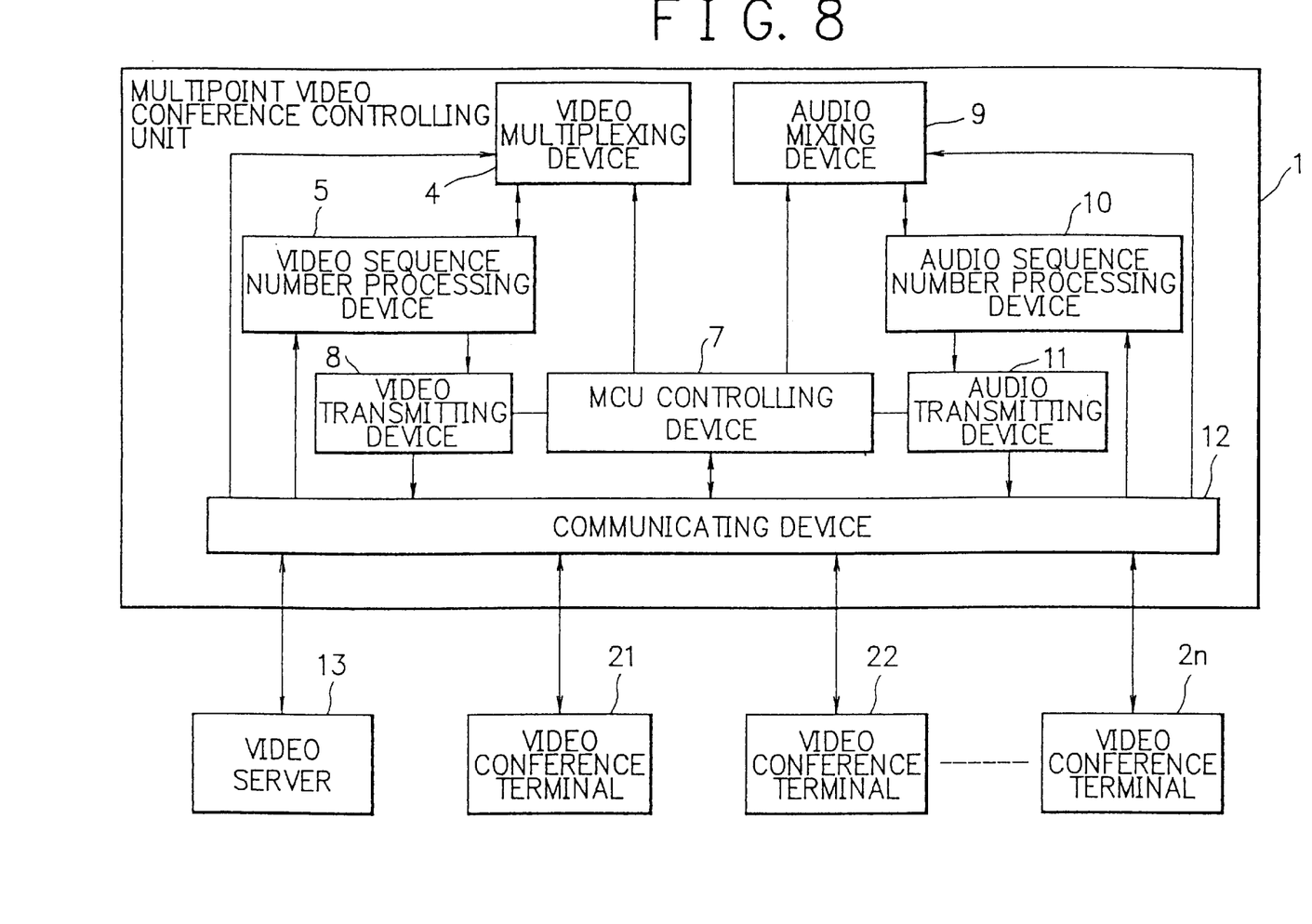
FIG. 8 is a block diagram of a multipoint video conference controlling system according to the third embodiment of the present invention.
Figure 9:
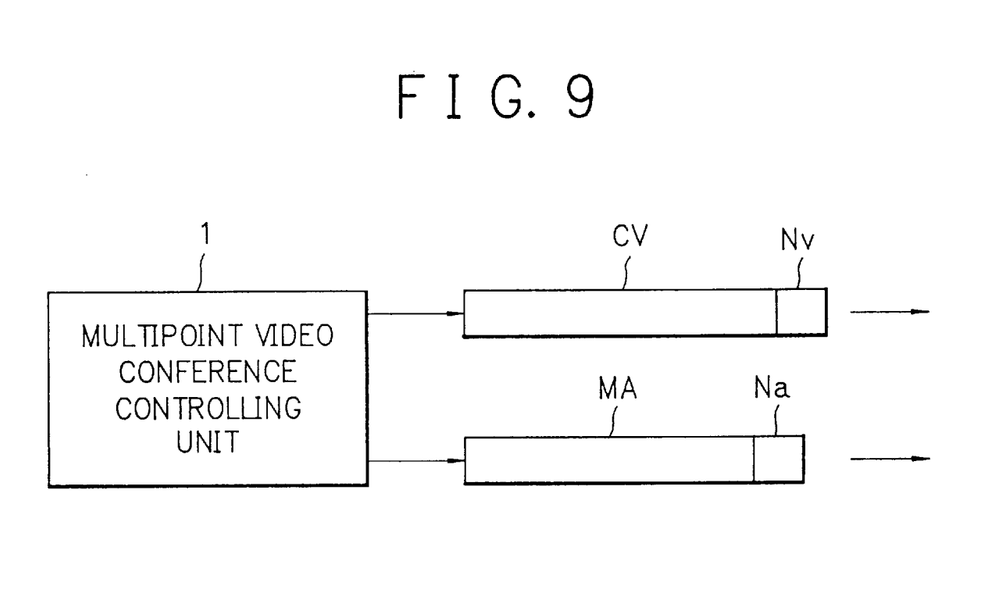
FIG. 9 is a view for use in describing a composite video packet and a mixed audio packet in the multipoint video conference controlling unit of the multipoint video conference controlling system illustrated in FIG. 8.
Figure 10:
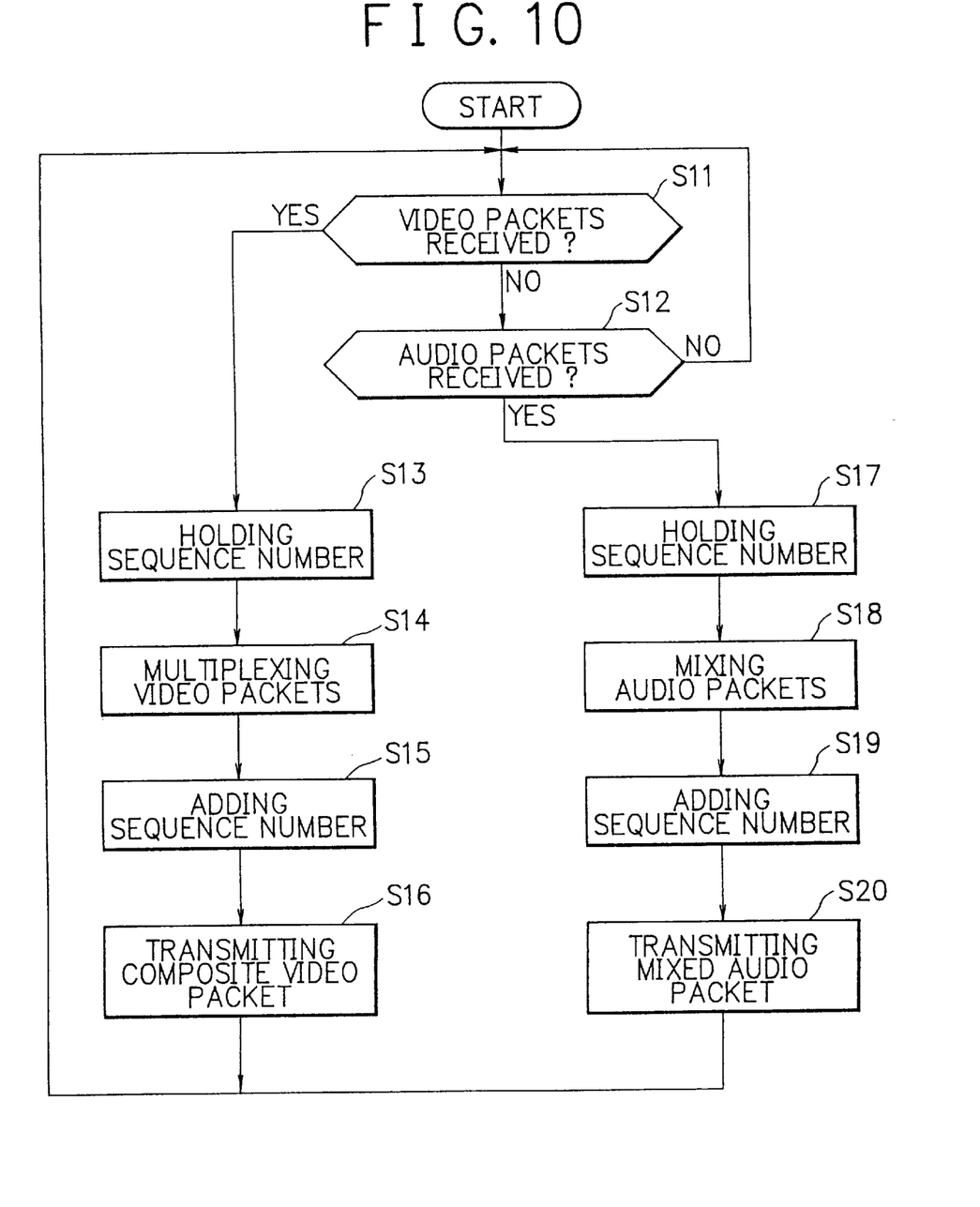
FIG. 10 is a flow chart for use in describing operation of a multipoint video conference controlling unit in the multipoint video conference controlling system illustrated in FIG. 8.

Referring to FIGS. 8, 9 and 10, description will proceed to a multipoint video conference controlling method and system according to the second embodiment of the present invention. Similar parts are designated by like reference numerals.

In FIG. 8, the multipoint video conference controlling system comprises the multipoint video conference controlling unit 1, the video conference terminals 21 to 2n, and the video server 13. The multipoint video conference controlling unit 1 comprises the video multiplexing device 4, the video sequence number processing device 5, the MCU controlling device 7, the video transmitting device 8, the audio mixing device 9, the audio sequence number processing device 10, the audio transmitting device 11, and the communicating device 12.

The communicating device 12 is connected to the video conference terminals 21 to 2n and the video server 13. The video multiplexing device 4 is connected to the communicating device 12, the video sequence number processing device 5, and the MCU controlling device 7. The video sequence number processing device 5 is connected to the communicating device 12. The video transmitting device 8 is connected to the communicating device 12, the video sequence number processing device 5, and the MCU controlling device 7. The audio mixing device 9 is connected to the communicating device 12, the audio sequence number processing device 10, and the MCU controlling device 7. The audio sequence number processing device 10 is connected to the communicating device 12. The audio transmitting device 11 is connected to the communicating device 12, the audio sequence number processing device 10, and the MCU controlling device 7. In addition, the MCU controlling device 7 is connected to the communicating device 12.

When the communicating device 12 is supplied with the video packets V1 to Vn having the sequence numbers from the video conference terminals 21 to 2n, the communicating device 12 supplies the video packets V1 to Vn having the sequence numbers for the video sequence number processing device 5. In this event, the video sequence number processing device 5 holds one of the sequence numbers to supply the video packets V1 to Vn for the video multiplexing device 4. The video multiplexing device 4 multiplexes the video packets V1 to Vn to produce a composite packet CV. The video multiplexing device 4 supplies the composite video packet CV for the video sequence number processing device 5. The video sequence number processing device 5 adds the one Nv of the sequence numbers to the composite video packet CV, for example, as shown in FIG. 9. The video sequence number processing device 5 supplies the composite video packet CV having the one of the sequence numbers for the video transmitting device 8.

When the communicating device 12 is supplied with the video packets VoDV having the sequence numbers from the video server 13, the communicating device 12 supplies the video packets VoDV having the sequence numbers for the video sequence number processing device 5. In this event, the video sequence number processing device 5 holds one of the sequence numbers to supply the video packets VoDV for the video multiplexing device 4. The video multiplexing device 4 multiplexes the video packets VoDV to produce a composite video packet CV. The video multiplexing device 4 supplies the composite video packet CV for the video sequence number processing device 5. The video sequence number processing device 5 adds the one of the sequence numbers to the composite video packet CV. The video sequence number processing device 5 supplies the composite video packet CV having the one of the sequence numbers for the video transmitting device 8.

When the communicating device 12 is supplied with the video packets V1 to Vn and VoDV having the sequence numbers from the video conference terminals 21 to 2n and the video server 13, the communicating device 12 supplies the video packets V1 to Vn and VoDV having the sequence numbers for the video sequence number processing device 5. In this event, the video sequence number processing device 5 holds one of the sequence numbers to supply the video packets V1 to Vn and VoDV for the video multiplexing device 4. The video multiplexing device 4 multiplexes the video packets V1 to Vn and VoDV to produce a composite video packet CV. The video multiplexing device 4 supplies the composite video packet CV for the video sequence number processing device 5. The video sequence number processing device 5 adds the one of the sequence numbers to the composite video packet CV. The video sequence number processing device 5 supplies the composite video packet CV having the one of the sequence numbers for the video transmitting device 8.

When the communicating device 12 is supplied with the audio packets A1 to An having the sequence numbers from the video conference terminals 21 to 2n, the communicating device 12 supplies the audio packets A1 to An having the sequence numbers for the audio sequence number processing device 10. In this event, the audio sequence number processing device 10 holds one of the sequence numbers to supply the audio packets A1 to An for the audio mixing device 9. The audio mixing device 9 mixes the audio packets A1 to An to produce a mixed audio packet MA. The audio mixing device 9 supplies the mixed audio packet MA for the audio sequence number processing device 10. The audio sequence number processing device 10 adds the one Na of the sequence numbers to the mixed audio packet MA, for example, as shown in FIG. 9. The audio sequence number processing device 10 supplies the mixed audio packet MA having the one of the sequence numbers for the audio transmitting device 11.

When the communicating device 12 is supplied with the audio packets VoDA having the sequence numbers from the video server 13, the communicating device 12 supplies the audio packets VoDA having the sequence numbers for the audio sequence number processing device 10. In this event, the audio sequence number processing device 10 holds one of the sequence numbers to supply the audio packets VoDA for the audio mixing device 9. The audio mixing device 9 mixes the audio packets VoDA to produce a mixed audio packet MA. The audio mixing device 9 supplies the mixed audio packet MA for the audio sequence number processing device 10. The audio sequence number processing device 10 adds the one of the sequence numbers to the mixed audio packet MA. The audio sequence number processing device 10 supplies the mixed audio packet MA having the one of the sequence numbers for the audio transmitting device 11.

When the communicating device 12 is supplied with the audio packets A1 to An and VoDA having the sequence numbers from the video conference terminals 21 to 2n and the video server 13, the communicating device 12 supplies the audio packets A1 to An and VoDA having the sequence numbers for the audio sequence number processing device 10. In this event. the audio sequence number processing device 10 holds one of the sequence numbers to supply the audio packets A1 to An and VoDA to the audio mixing device 9. The audio mixing device 9 mixes the audio packets A1 to An and VoDA to produce a mixed audio packet MA. The audio mixing device 9 supplies the mixed audio packet MA for the audio sequence number processing device 10. The audio sequence number processing device 10 adds the one of the sequence numbers to the mixed audio packet MA. The audio sequence number processing device 10 supplies the mixed audio packet MA having the one of the sequence numbers for the audio transmitting device 11.

The video transmitting device 8 and the audio transmitting device 11 synchronously transmit the composite video packet CV and the mixed audio packet MA each of which has the sequence numbers to the video conference terminals 21 to 2n through the communicating device 12. The MCU controlling device 7 controls the video multiplexing device 4, the video transmitting device 8, the audio mixing device 9, the audio transmitting device 11, and the communicating device 12. In this event, the video conference terminals 21 to 2n display and output the composite video packet CV and the mixed audio packet MA in response to the sequence numbers of the composite video packet CV and the mixed audio packet MA.

Referring to FIG. 10, description will proceed to operation of the multipoint video conference controlling unit 1. At step S11, the MCU controlling device 7 judges whether or not the video packets are received by the communicating device 12. When the video packets are received by the communicating device 12, the step S11 is followed by step S13.

Otherwise, the step S11 is followed by step S12. At the step S12, the MCU controlling device 7 judges whether or not the audio packets are received by the communicating device 12.

When the audio packets are received by the communicating device 12, the step S12 is followed by step S17. Otherwise, the step S12 returns to the step S11.

At the step S13, the video sequence number processing device 5 holds the one of the sequence numbers of the video packets to supply the video packets for the video multiplexing device 4. The step S13 proceeds to step S14 at which the video multiplexing device 4 multiplexes the video packets to produce the composite video packet CV. In addition, at the step S14, the video multiplexing device 4 supplies the composite video packet CV for the video sequence number processing device 5. The step S14 proceeds to step S15 at which the video sequence number processing device 5 adds the one of the sequence numbers to the composite video packet CV. In addition, the video sequence number processing device 5 supplies the composite video packet CD having the one of the sequence numbers for the video transmitting device 8. The step S15 proceeds to step S16.

At the step S17, the audio sequence number processing device 10 holds the one of the sequence numbers of the audio packets to supply the audio packets for the audio mixing device 9. The step S17 proceeds to step S18 at which the audio mixing device 9 mixes the audio packets to produce a mixed audio packet MA. In addition, at the step S18, the audio mixing device 9 supplies the mixed audio packet MA for the audio sequence number processing device 10. The step S18 proceeds to step S19 at which the audio sequence number processing device 10 adds the one of the sequence numbers to the mixed audio packet MA. In addition, at the step S89, the audio sequence number processing device 10 supplies the mixed audio packet MA having the one of the sequence numbers for the audio transmitting device 11. The step S19 proceeds to step S20.

At the steps S16, the video transmitting device 8 transmits the composite packet CV having the one of the sequence numbers to the video conference terminals 21 to 2n through the communicating device 12. At the step S20, the audio transmitting device 11 transmits the mixed audio packet MA having the one of the sequence numbers to the video conference terminals 21 to 2n through the communicating device 12. In this event, the video transmitting device 8 and the audio transmitting device 11 synchronously transmit the composite video packet CV and the mixed audio packet MA each of which has the one of the sequence numbers to the video conference terminals 21 to 2n through the communicating device 12. The steps S16 and S20 return to the step S11.

Figure 11:
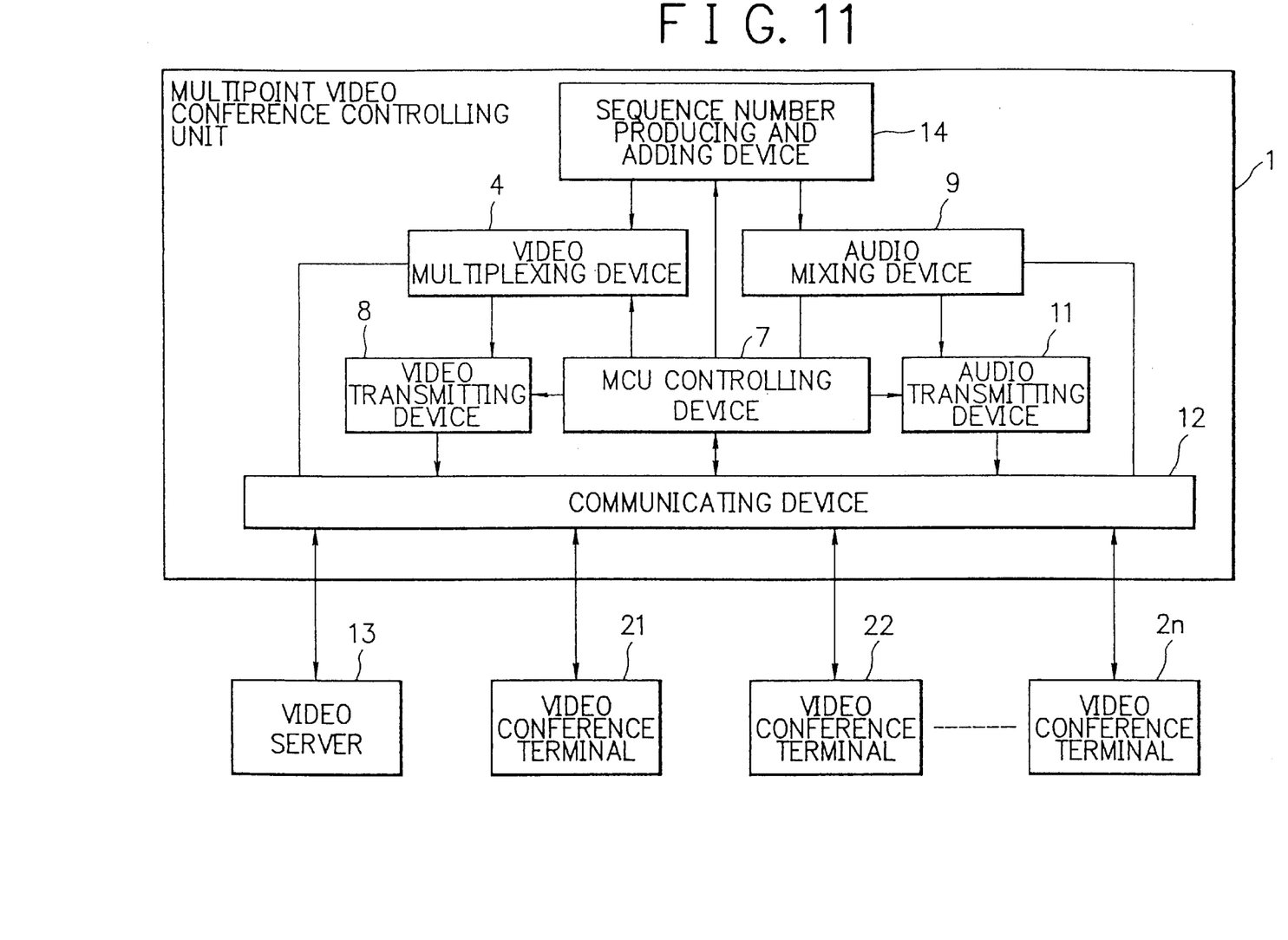
FIG. 11 is a block diagram of a multipoint video conference controlling system according to the fourth embodiment of the peent invention.
Figure 12:
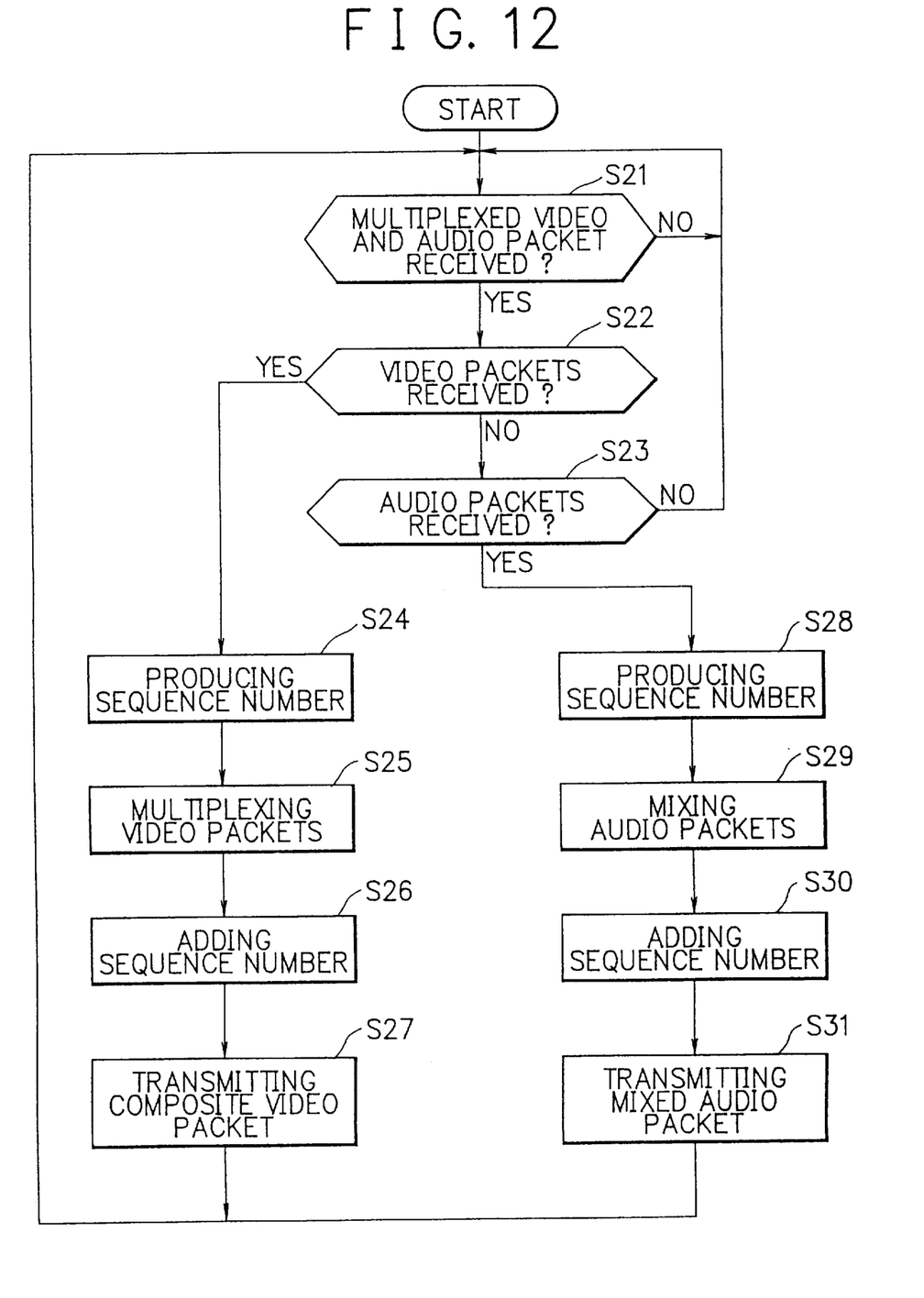
FIG. 12 is a flow chart for use in describing operation of a multipoint video conference controlling unit in the multipoint video conference controlling system illustrated in FIG. 11.

Referring to FIGS. 11 and 12, description will proceed to a multipoint video conference controlling system according to the fourth embodiment of the present invention.

In FIG. 11, the multipoint video conference controlling system comprises the multipoint video conference controlling unit 1, the video conference terminals 21 to 2n, and the video server 13. The multipoint video conference controlling unit 1 comprises the video multiplexing device 4, a sequence number producing and adding device 14, the MCU controlling device 7, the video transmitting device 8, the audio mixing device 9, the audio transmitting device 11, and the communicating device 12.

The communicating device 12 is connected to the video conference terminals 21 to 2n and the video server 13. The video multiplexing device 4 is connected to the communicating device 12, the sequence number producing and adding device 14, and the MCU controlling device 7. The video transmitting device 8 is connected to the communicating device 12, the video multiplexing device 4, and the MCU controlling device 7.

The audio mixing device 9 is connected to the communicating device 12, the sequence number producing and adding device 14, and the MCU controlling device 7. The audio transmitting device 11 is connected to the communicating device 12, the audio mixing device 9, and the MCU controlling device 7. In addition, the MCU controlling device 7 is connected to the communicating device 12. The video server 13 supplies multiplexed video and audio packets each of which has the video packets and the audio packets. The video packets and the audio packets of the multiplexed video and audio packet are synchronized.

When the communicating device 12 is supplied with the video packets V1 to Vn having the sequence numbers from the video conference terminals 21 to 2n, the communicating device 12 supplies the video packets V1 to Vn having the sequence numbers for the video multiplexing device 4. In this event, the video multiplexing device 4 multiplexes the video packets V1 to Vn to produce the composite video packet CV. The video multiplexing device 4 supplies the composite video packet CV for the video conference terminals 21 to 2n through the communicating device 12.

When the communicating device 12 is supplied with one of the multiplexed video and audio packets that has the video packets and the audio packets from the video server 13, the communicating device 12 demultiplexes the one of the multiplexed video and audio packet that has the video packets and the audio packets to produce the video packets and the audio packets. In this event, the communicating device 12 supplies the video packets for the video multiplexing device 4 and supplies the audio packets for the audio mixing device 9.

Also, when the communicating device 12 is supplied with one of the multiplexed video and audio packets that has the video packets and the audio packets from the video server 13. the MCU controlling device 7 produces and supplies a sequence number adding command signal to the sequence number producing and adding device 14. The sequence number producing and adding device 14 produces a sequence number in response to the sequence number adding command signal to hold the sequence number. The sequence number producing and adding device 14 supplies the sequence number for the video multiplexing device 4 and for the audio mixing device 9. The video multiplexing device 4 multiplexes the video packets to produce the composite video packet CV. In addition, the sequence number producing and adding device 14 adds the sequence number to the composite video packet CV of the video multiplexing device 4. The video multiplexing device 4 supplies the composite video packet CV having the sequence number for the video transmitting device 8.

Also, the audio mixing device 9 mixes the audio packets to produce the mixed audio packet MA. In addition, the sequence number producing and adding device 14 adds the sequence number to the mixed audio packet MA of the audio mixing device 9. The audio mixing device 9 supplies the mixed audio packet MA having the sequence number for the audio transmitting device 11. The video transmitting device 8 and the audio transmitting device 11 synchronously transmit the composite video packet CV having the sequence number and the mixed audio packet MA having the sequence number to the video conference terminals 21 to 2n through the communicating device 12. In this event, the video conference terminals 21 to 2n display and output the composite video packet CV and the mixed audio packet MA in response to the sequence numbers of the composite video packet CV and the mixed audio packet MA.

Referring to FIG. 12, description will proceed to operation of the multipoint video conference controlling unit 1. At step S21, the MCU controlling device 7 judges whether or not the multiplexed video and audio packet is received by the communicating device 12. When the multiplexed video and audio packet is received by the communicating device 12. the step S21 is followed by step S22. Otherwise, the step S21 is repeated again. At the step S22, the MCU controlling device 7 judges whether or not the video packets are received by the communicating device 12. When the video packets are received by the communicating device 12, the step S22 is followed by step S24. Otherwise, the step S22 is followed by step S23. At the step S23, the MCU controlling device 7 judges whether or not the audio packets are received by the communicating device 12. When the audio packets are received by the communicating device 12, the step S23 is followed by step S28. Otherwise, the step S23 returns to the step S21.

At the step S24, the sequence number producing and adding device 14 produces a sequence number in response to the sequence number adding command signal from the MCU controlling device 7 to supply the sequence number for the video multiplexing device 4. The step S24 proceeds to step S25 at which the video multiplexing device 4 multiplexes the video packets to produce the composite video packet CV. The step S25 proceeds to step S26 at which the sequence number producing and adding device 14 adds the sequence number to the composite video packet CV of the video multiplexing device 4.

In addition, at the step S26, the video multiplexing device 4 supplies the composite video packet CD having the sequence numbers for the video transmitting device 8. The step S26 proceeds to step S27.

At the step S28, the sequence number producing and adding device 14 produces the sequence number in response to the sequence number adding command signal from the MCU controlling device 7 to supply the sequence number for the audio mixing device 9. The step S28 proceeds to step S29 at which the audio mixing device 9 mixes the audio packets to produce a mixed audio packet MA. The step S29 proceeds to step S30 at which the sequence number producing and adding device 14 adds the sequence numbers to the mixed audio packet MA of the audio mixing device 9. In addition, at the step S30, the audio mixing device 9 supplies the mixed audio packet MA having the sequence number for the audio transmitting device 11. The step S30 proceeds to step S31.

At the steps S27, the video transmitting device 8 transmits the composite video packet CV having the sequence number to the video conference terminals 21 to 2n through the communicating device 12. At the step S31, the audio transmitting device 11 transmits the mixed audio packet MA having the sequence number to the video conference terminals 21 to 2n through the communicating device 12. In this event, the video transmitting device 8 and the audio transmitting device 11 synchronously transmit the composite video packet CV and the mixed audio packet MA each of which has the sequence number to the video conference terminals 21 to 2n through the communicating device 12. The steps S27 and S31 return to the step S21.

What is claimed is:

1. A multipoint video conference controlling method, which is supplied with video packets having sequence numbers and audio packets having sequence numbers from a plurality of video conference terminals, multiplexes said video packets to produce a composite video packet, mixes said audio packets to produce a mixed audio packet, and transmits said composite video packet and said mixed audio packet to said video conference terminals, said multipoint video conference controlling method comprising the steps of:

collating said sequence numbers of said video packets and said audio packets to produce a coincidence signal when said sequence numbers of said video packets and said audio packets coincide with each other; and transmitting synchronously said composite video packet and said mixed audio packet in response to said coincidence signal.

2. A multipoint video conference controlling method, which is supplied with video packets and audio packets from a plurality of video conference terminals, multiplexes said video packets to produce a composite video packet, mixes said audio packets to produce a mixed audio packet, and transmits said composite video packet and said mixed audio packet to said video conference terminals, said multipoint video conference controlling method comprising the steps of:

adding corresponding sequence numbers to said composite video packet and said mixed audio packet when said video packets and said audio packets are supplied from the plurality of video conference terminals with sequence numbers; and transmitting synchronously said composite video packet and said mixed audio packet having said corresponding sequence numbers.

3. A multipoint video conference controlling method, which is supplied with video packets having sequence numbers and audio packets having sequence numbers from a plurality of video conference terminals and a video server, multiplexes said video packets to produce a composite video packet, mixes said audio packets to produce a mixed audio packet, and transmits said composite video packet and said mixed audio packet to said video conference terminals, said multipoint video conference controlling method comprising the steps of:

collating said sequence numbers of said video packets and said audio packets from said video server to produce a coincidence signal when said sequence numbers of said video packets and said audio packets from said video server coincide with each other; and transmitting synchronously said composite video packet and said mixed audio packet in response to said coincidence signal.

4. A multipoint video conference controlling method, which is supplied with video packets and audio packets from a plurality of video conference terminals and a video server, multiplexes said video packets to produce a composite video packet, mixes said audio packets to produce a mixed audio packet, and transmits said composite video packet and said mixed audio packet to said video conference terminals, said multipoint video conference controlling method comprising the steps of:

adding corresponding sequence numbers to said composite video packet and said mixed audio packet when said video packets and said audio packets are supplied from said video server with sequence numbers; and transmitting synchronously said composite video packet and said mixed audio packet having said corresponding sequence numbers.

5. A multipoint video conference controlling method, which is supplied with video packets and audio packets from a plurality of video conference terminals, and with multiplexed video and audio packets each of which has said video packets and said audio packets from a video server, multiplexes said video packets to produce a composite video packet, mixes said audio packets to produce a mixed audio packet, and transmits said composite video packet and said mixed audio packet to said video conference terminals, said multipoint video conference controlling method comprising the steps of:

producing sequence numbers in response to one of said multiplexed video and audio packets from said video server;

adding said sequence numbers to said composite video packet and said mixed audio packet; and transmitting synchronously said composite video packet and said mixed audio packet having said sequence numbers.

6. A multipoint video conference controlling system, which is supplied with video packets having sequence numbers and audio packets having sequence numbers from a plurality of video conference terminals, multiplexes said video packets to produce a composite video packet, mixes said audio packets to produce a mixed audio packet, and transmit said composite video packets and said mixed audio packet to said video conference terminals, said multipoint video conference controlling system comprising:

collating means for collating said sequence numbers of said video packets and said audio packets to produce a coincidence signal when said sequence numbers of said video packets and said audio packets coincide with each other; and transmitting means for transmitting synchronously said composite video packet and said mixed audio packet when said transmitting means is supplied with said coincidence signal from said collating means.

7. A multipoint video conference controlling system, which is supplied with video packets and audio packets from a plurality of video conference terminals, multiplexes said video packets to produce a composite video packet, mixes said audio packets to produce a mixed audio packet, and transmits said composite video packet and said mixed audio packet to said video conference terminals, said multipoint video conference controlling system comprising:

adding means for adding corresponding sequence numbers to said composite video packet and said mixed audio packet when said video packets and said audio packets are supplied from the plurality of video conference terminals with sequence numbers; and transmitting means for transmitting synchronously said composite video packet and said mixed audio packet having said corresponding sequence numbers.

8. A multipoint video conference controlling system, which is supplied with video packets having sequence numbers and audio packets having sequence numbers from a plurality of video conference terminals and a video server, multiplexes said video packets to produce a composite video packet, mixes said audio packets to produce a mixed audio packet, and transmits said composite video packet and said mixed audio packet to said video conference terminals, said multipoint video conference controlling system comprising:

collating means for collating said sequence numbers of said video packets and said audio packets from said video server to produce a coincidence signal when said sequence numbers of said video packets and said audio packets from said video server coincide with each other; and transmitting means for transmitting synchronously said composite video packet and said mixed audio packet when said transmitting means is supplied with said coincidence signal from said collating means.

9. A multipoint video conference controlling system as claimed in claim 8, wherein said multipoint video conference controlling system further comprises:

another collating means for collating said sequence numbers of said video packets and said audio packets from said video conference terminals to produce another coincidence signal when said sequence numbers of said video packets and said audio packets from said video conference terminals coincide with each other; and another transmitting means for transmitting synchronously said composite video packet and said mixed audio packet when the other transmitting means is supplied with the other coincidence signal from the other collating means.

10. A multipoint video conference controlling system, which is supplied with video packets and audio packets from a plurality of video conference terminals and a video server, multiplexes said video packets to produce a composite video packet, mixes said audio packets to produce a mixed audio packet, and transmits said composite video packet and said mixed audio packet to said video conference terminals, said multipoint video conference controlling system comprising:

adding means for adding corresponding sequence numbers to said composite video packet and said mixed audio packet when said video packets and said audio packets are supplied from said video server with sequence numbers; and transmitting means for transmitting synchronously said composite video packet and said mixed audio packet having said corresponding sequence numbers.

11. A multipoint video conference controlling system as claimed in claim 10, wherein said multipoint video conference controlling system further comprises another adding means for adding corresponding sequence numbers to said composite video packet and said mixed audio packet when said video packets and said audio packets are supplied from said video conference terminals with sequence numbers.

12. A multipoint video conference controlling system, which is supplied with video packets and audio packets from a plurality of video conference terminals, and with multiplexed video and audio packets each of which has said video packets and said audio packets fr om a video server, multiplexes said video packets to produce a composite video packet, mixes said audio packets to produce a mixed audio packet, and transmits said composite video packet and said mixed audio packet to said video conference terminals, said multipoint video conference controlling system comprising:

producing means for producing sequence numbers in response to one of said multiplexed video and audio packets from said video server;

adding means for adding said sequence numbers to said composite video packet and said mixed audio packet; and transmitting means for transmitting synchronously said composite video packet and said mixed audio packet having said sequence numbers.

\* \* \* \* \*